United States Patent Office 3,277,092
Patented Oct. 4, 1966

3,277,092
5,6-SUBSTITUTED DIHYDRO-5-FLUORO-PYRIMIDINES
Robert Duschinsky, Essex Fells, and Max Hoffer, Nutley, N.J., assignors to Hoffman-La Roche Inc., Nutley, N.J., a corporation of New Jersey
No Drawing. Filed May 2, 1963, Ser. No. 277,441
8 Claims. (Cl. 260—256.4)

This invention relates, in general, to novel chemical compounds and to novel processes for producing same. More particularly, the invention relates to novel derivatives of 5-fluorouracil and 5-fluorocytosine; to methods of producing such derivatives; and to intermediates which are useful in producing such derivatives and in practicing said methods.

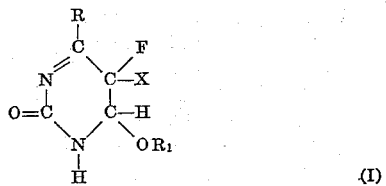
(I)

in which the symbol R represents either a hydroxy or amino group; $R_1$ represents a hydrogen atom, a lower alkyl group or an acyl group; and X represents hydrogen or a halogen atom.

Thus, embraced by Formula I, and encompassed within the scope of this invention, are hydrouracil compounds having the tautomeric formula:

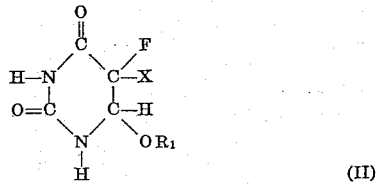
(II)

as well as hydrocytosine compounds having the formula:

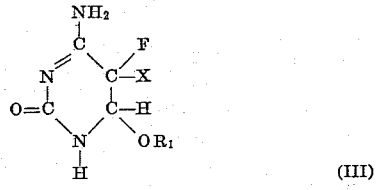
(III)

The symbols X and $R_1$ in Formulas II and III have the same meanings as in Formula I.

The alkyl groups which, in Formulas I, II, and III are represented by the symbol $R_1$, are lower alkyl groups containing from 1 to 4 carbon atoms, such as methyl, ethyl, propyl, isopropyl, butyl, isobutyl, etc. groups. The acyl groups which, in Formulas I, II, and III, are represented by the symbol $R_1$ are acyl groups containing from 2 to 4 carbon atoms such as acetyl, propionyl, butyryl, etc. groups. The halogen atoms which, in Formulas I, II, and III are represented by the symbol X are, for example, chlorine and bromine.

The compounds of this invention can be produced, conveniently, by any one of several methods. For example, compounds of Formulas I to III, inclusive, in which the symbol X represents a halogen atom and the symbol $R_1$ represents hydrogen, can be prepared by reacting the starting base, that is, 5-fluorouracil in the case of Formula II compounds and 5-fluorocytosine in the case of Formula III compounds, with a hypohalic acid. In an alternate method, such compounds can be prepared by reacting 5-fluorouracil or 5-fluorocytosine with a halogen in the presence of water. Similarly, compounds of Formulas I to III, inclusive, in which the symbol X represents a halogen atom and the symbol $R_1$ represents hydrogen, can be produced by reacting 5-fluorouracil or 5-fluorocytosine with a hydrogen halide in the presence of hydrogen peroxide. As the hypohalic acid reactant in the first method, one can use, for example, hypochloric acid or hypobromic acid. As the halogen reactant in the second method, one can use, for example, bromine or chlorine. As the hydrogen halide reactant in the third method, one can use, for example, hydrochloric acid or hydrobromic acid.

Compounds of Formulas I to III, inclusive, in which the symbol X represents a halogen atom and in which the symbol $R_1$ represents an alkyl group, can also be obtained by any one of several methods. For example, such compounds can be produced by reacting the starting base, that is, 5-fluorouracil in the case of Formula II compounds and 5-fluorocytosine in the case of Formula III compounds, with an ester of a hypohalic acid. Additionally, such compounds can be prepared by reacting 5-fluorouracil or 5-fluorocytosine with a halogen and a suitable monohydric alcohol. Furthermore, the compounds of Formulas I to III, inclusive, in which the symbol X represents a halogen atom and the symbol $R_1$ represents a butyl group can be prepared by reacting the corresponding methoxy compound with butanol in the presence of a suitable catalyst, such as hydrogen bromide. This reaction is carried out, preferably, by removing the lower boiling alcohol by distillation. In the first method, one can use, for example, methyl hypobromite, or butyl hypochlorite, etc. as the hypohalic acid ester reactant. In the second method, one can use, for example, chlorine or bromine as the halogen reactant and an aliphatic, monohydric alcohol having a carbon chain length of from 1 to 4 carbon atoms as the alcohol reactant. Methanol, ethanol, propanol, isopropanol, butanol, isobutanol, etc. are examples of alcohols which are well suited for use in such a method. Compounds of Formulas I, II, and III, in which the symbol $R_1$ represents a methyl or ethyl group, are prepared, preferably, by the second procedure. Compounds of Formulas I, II, and III, in which the symbol $R_1$ represents a butyl group are prepared, preferably, by the third procedure.

Compounds of Formulas I, II, and III, inclusive, in which the symbol $R_1$ represents an acyl group, can be obtained by reacting the starting base, that is, 5-fluorouracil or 5-fluorocytosine, with a halogen in the presence of an acylating agent and the acid corresponding thereto. For example, such compounds are prepared by reacting 5-fluorouracil or 5-fluorocytosine with chlorine or bromine in the presence of acetic anhydride, or acetyl chloride, and acetic acid; or in the presence of propionyl chloride and propionic acid; or in the presence of butyryl chloride and butyric acid, etc.

One can readily prepare compounds of Formula I, in which the symbol X represents hydrogen and in which the symbol R represents hydrogen, lower alkyl or acyl by dehalogenating the corresponding halogen substituted compound. Removal of the halogen atom from the halogenated compound can be acomplished either by reacting the halogenated compound with a chemical reducing agent or by reacting the halogenated compound with hydrogen in the presence of a catalyst. However, due to the fact that the halogenated compound is decomposed in an alkaline media, dehalogenation should be carried out in an acid or neutral environment. In the case of catalytic dehalogenation, the reaction mixture should be maintained at about pH 7.0 or lower. More specifically, dehalogenation by chemical means can be accomplished conveniently by reacting the halogenated compound with an alkali hydrosulfide, as, for example, sodium hydrosulfide, potassium hydrosulfide, etc. Dehalogenation of the halogen substituted compound by catalytic means can be accomplished using palladium, platinum, or palladium on charcoal as the catalyst. Catalytic dehalogenation of the compound is effected, preferably, at room temperature or lower, in the presence of a buffer at a pH between 3.0 and 7.0. As the buffer, one may use, for example, a mixture of sodium acetate and acid or a phosphate. The dehalogenation step of the preferred procedure is carried out by reacting the halogenated compound with hydrogen in the presence of a suitable catalyst.

The compounds of this invention contain asymmetrical carbon atoms and, hence, in the practice of this invention they are obtained in the form of racemates. The optically active forms of these compounds can be prepared by the oxidation of the optically active forms of the corresponding nucleosides.

The compounds of Formula I are useful as germicidal agents being active, for example, against gram positive and gram negative and against yeasts and fungi.

For a fuller understanding of the nature and objects of this invention, reference may be had to the following examples which are given merely as further illustration for the invention and are not to be construed in a limiting sense.

EXAMPLE 1

*Preparation of d,l-5-bromo-5-fluoro-6-methoxyhydrouracil*

In this example 52.0 grams of 5-fluorouracil were suspended in 1600 ml. of methanol. The suspension was stirred and heated at reflux temperature. At such temperature, 64.0 grams of bromine were added, drop by drop, to the solution. The reaction mixture was refluxed for a period of about 30 minutes, following which the solution was evaporated in a vacuum and the hydrobromide compound was removed therefrom by adding small amounts of methanol and subsequently, evaporating same. The crystalline residue, thus obtained, was then slurred with 500 ml. of water and thereafter filtered by suction. The product was then dried at a temperature within the range from about 60° C. to about 80° C. and there was obtained 78.0 grams (82% of theory) of d,l-5-bromo-5-fluoro-6-methoxyhydrouracil melting at 208° to 210° C. Upon recrystallization from ethyl acetate, d,l-5-bromo-5-fluoro-6-methoxyhydrouracil melting at 214° to 215° was obtained.

*Analysis.*—Calcd. for $C_5H_6O_3N_2BrF$: C, 25.0; H, 2.5; Br, 33.2. Found: C, 25.29; H, 2.33; Br, 33.20.

EXAMPLE 2

*Preparation of d,l-5-fluoro-6-methoxyhydrouracil*

A solution of 22.5 grams of potassium hydroxide in 500 ml. of methanol was saturated with 14.0 grams of hydrogen sulfide at a temperature of about 0° C. Thereafter, 78.0 grams of d,l-5-bromo-5-fluoro-6-methoxyhydrouracil produced as described in Example 1, were added to such solution slowly at a temperature of about 0° C. The reaction commenced almost immediately, as evidenced by the slight evolution of heat, the formation of a yellow discoloration and evolution of hydrogen sulfide gas. After the spontaneous reaction had subsided, the mixture was heated at its reflux temperature for a period of about 20 minutes, following which it was allowed to cool to room temperature and filtered. The filtrate was evaporated under reduced pressure, with continuous stirring, to form a crystalline mass. This mass was dried at a temperature within range from about 50° C. to about 60° C., following which it was stirred with 50 ml. of cool water. The undissolved material was collected by filtration with suction and, subsequently, it was recrystallized from 120 ml. of hot water. The product, thus obtained, namely d,l-5-fluoro-6-methoxyhydrouracil, crystallized rapidly from the solution upon chilling in the form of pale yellow plates. The product was collected by filtration.

The crude product, thus produced, was purified in the following manner. A solution was prepared by dissolving d,l-5-fluoro-6-methoxyhydrouracil in boiling methanol. This solution was filtered while hot through celite and the filtrate was chilled to effect crystallization. This procedure was repeated 14 additional times. There was obtained d,l-5-fluoro-6-methoxyhydrouracil in a yield amounting to 46% of theory. At a temperature of 195° C. this product split spontaneously into methanol and 5-fluorouracil and then the residue manifested the melting point of 5-fluorouracil at a temperature of 285° C.

*Analysis.*—Calcd. for $C_5H_7O_3N_2F$: C, 37.05; H, 4.3; $OCH_3$, 19.05. Found: C, 37.51; H, 4.75; $OCH_3$, 18.82.

EXAMPLE 3

*Preparation of d,l-5-chloro-5-fluoro-6-hydroxyhydrouracil*

In this example, 13.0 grams of fluorouracil were suspended in 40 ml. of concentrated aqueous hydrochloric acid. To this suspension, there was added 10 ml. of 30% aqueous hydrogen peroxide. During this addition the temperature of the reaction mixture was maintained at below about 55° C. by intermittently immersing the vessel containing the reaction mixture into a mixture of ice and water. After the endothermic action has ceased, 10 ml. of hydrogen peroxide solution were added to the reaction mixture at a temperature from about 40 C. to about 55° C. The mixture was then shaken at a temperature below about 55° C. until a solution is formed. This solution was, thereafter, chilled to a temperature of about 0° C. at which temperature a crystalline product formed which was recovered by filtration with suction. The product, namely, d,l-5-chloro-5-fluoro-6-hydroxyhydrouracil, was obtained in a yield of about 12 grams. This compound was recrystallized from a mixture of 25 ml. of ethyl acetate and 36 ml. of ether. The recrystallized d,l-5-chloro-5-fluoro-6-hydroxyhydrouracil melted at a temperature of 196° C.

*Analysis.*—Calcd. for $C_4H_4O_3N_2ClF$: N, 15.35; Cl, 19.45. Found: N, 15.12; Cl, 19.58.

EXAMPLE 4

*Preparation of d,l-5-chloro-5-fluoro-6-acetoxyhydrouracil*

In this example, 1.8 grams of d,l-5-chloro-5-fluoro-6-hydroxyhydrouracil, produced as described in Example 3, was suspended in 3 ml. of acetic anhydride and one drop of concentrated hydrochloric acid was added thereto. The reactants went into solution with the evolution of heat and the desired product crystallized upon cooling the solution. Recrystallization of the crude product from ethanol-heptane yielded d,l-5-chloro-5-fluoro-6-acetoxyhydrouracil melting at a temperature of 172° to 173° C.

A sample of this product heated with zinc-dust in acetic acid gave 5-fluorouracil.

*Analysis.*—Calcd. for $C_6H_6O_4N_2ClF$: N, 12.48. Found: N, 12.40.

EXAMPLE 5

*Preparation of d,l-5-bromo-5-fluoro-6-ethoxyhydrouracil*

In this example, 52.0 grams of 5-fluorouracil suspended in 800 ml. of absolute alcohol were treated, in a dropwise fashion, with 20 ml. of bromine while the suspension was heated at a temperature of within a range from about 50° to 60° C. The reaction mixture was stirred until a clear and colorless solution had been obtained. Thereafter, 600 ml. of the solvent were removed from the solution by distillation under reduced pressure. The residue remaining after this distillation had been completed was poured into 1.0 liter of ice water and there was thus formed a crystalline, white precipitate which was recovered by filtration with suction. The product, namely, d,l-5-bromo-5-fluoro-6-ethoxyhydrouracil was obtained in a yield of 82.0 grams. This crude product melted at a temperature of 208° C., with decomposition. 5-fluorouracil was recovered in a nearly theoretical amount from the decomposition product.

The crude 5-bromo-5-fluoro-6-ethoxyhydrouracil was recrystallized from toluene to yield the pure compound melting at a temperature of 211° C.

*Anal.*—Calcd. for $C_6H_8O_3N_2FBr$: C, 28.3; H, 3.15; Br, 31.4. Found: C, 28.40; H, 2.91; Br, 31.14.

EXAMPLE 6

*Preparation of d,l-6-ethoxy-5-fluorohydrouracil*

In this example, 9.2 grams of sodium were added to and dissolved in 500 ml. of absolute ethanol. This solution was saturated with hydrogen sulfide at a temperature of 0° C. To the stirring solution, at a temperature of 0° C., there was added 100 grams of d,l-5-bromo-5-fluoro-6-ethoxyhydrouracil, produced as described in Example 5. The reaction mixture was allowed to warm to room temperature by allowing it to stand at room temperature for a period of about 60 minutes. Thereafter, the reaction was heated to, and maintained at, its reflux temperature for a period about 30 minutes. The reaction mixture was then filtered while hot. The desired product was recovered by evaporation of the filtrate and recrystallization of the residue from 200 ml. of water. There was obtained 27 grams of d,l-6-ethoxy-5-fluorohydrouracil. This compound melted at a temperature of about 195° C., resolidified again at a temperature above about 200° C. with loss of alcohol and decomposition into 5-fluorouracil.

*Anal.*—Calcd. for $C_6H_9O_3N_2F$: C, 40.9; H, 5.1; F, 10.8. Found: C, 40.12; H, 4.98; F, 10.9.

EXAMPLE 7

*Preparation of d,l-5-bromo-5-fluoro-6-butoxyhydrouracil*

In carrying out this example, there was first prepared a solution of 82.0 grams of 5-bromo-5-fluoro-6-methoxyhydrouracil, produced as described in Example 1 in 240 ml., in n-butanol. To this solution there was added 2.0 ml. of concentrated hydrobromic acid. Subsequently, 100 ml. of the solvent, together with the methanol formed in the reaction, were removed by distillation, the removal of the solvent being effected over a period of about two hours. Thereafter, 100 ml. of fresh n-butanol was added to the reaction mixture and, once again, the reaction mixture was distilled to effect the romoval of 100 ml. of the solvent. Removal of this quantity of solvent was accomplished over a period of two hours. The residue which remained was washed with water and, subsequently, it was evaporated in a vacuum. The residual syrup was slurried with heptane to effect crystallization of d,l-5-bromo-5-fluoro-6-butoxyhydrouracil. This compound was recrystalllized from aqueous methanol to yield the compound melting at a temperature of 167° C.

*Anal.*—Calcd. for $C_8H_{12}O_3N_2F$: C, 34.0; H, 4.24; Br, 28.3. Found: C, 33.94; H, 4.23; Br, 28.28.

EXAMPLE 8

*Preparation of d,l-5-fluoro-6-butoxyhydrouracil*

In this example, 6.5 grams of sodium were dissolved in 500 ml. of butanol with stirring. The mixture was heated at its reflux temperature. Thereafter, the solution was chilled to a temperature of about 0° C., following which it was saturated with hydrogen sulfide. To this chilled solution there was added 75.0 grams of d,l-5-bromo-5-fluoro-6-butoxyhydrouracil, produced as described in Example 7. This mixture was heated to its reflux temperature and it was maintained at that temperature for a period of about 30 minutes. Thereafter, the solution was filtered while hot and the filtrate was evaporated to dryness in a vacuum. Upon recrystallization of the residue from about 12 to 15 times its volume of water, there was obtained d,l-5-fluoro-6-butoxyhydrouracil melting at 189° to 190° C. Decomposition of this product into fluorouracil and butanol occurred at 195° to 200° C.

EXAMPLE 9

*Preparation of d,l-6-acetoxy-5-bromo-5-fluorohydrouracil*

In this example, there was prepared a suspension of 24.0 grams of 5-fluorouracil in 300 ml. of acetic acid and 300 ml. of acetic anhydride. This suspension was cooled to a temperature of about 5° C. and, while the suspension was being continuously stirred, there was added thereto 15 ml. of bromine. The mixture, which was thus obtained, was allowed to stand at room temperature for a period of about 24 hours. At the end of this time, an additional 5.0 ml. of bromine was added to the mixture. Thereafter, the mixture was evaporated in vacuo and the syrup which was thus obtained was crystallized from a mixture of 5 ml. of acetic anhydride and 20 ml. of chloroform. Subsequently, the product was recovered by filtration and washed with a mixture of 5 ml. of acetic anhydride and 20 ml. of chloroform.

Upon filtration and drying, there was obtained 31.24 grams (75% of theory) of d,l-6-acetoxy-5-bromo-5-fluorohydrouracil melting at 163.5° to 165.5° C. Recrystallization of this compound from a mixture of 95 ml. of acetic anhydride and 300 ml. of chloroform yielded 25.6 grams of d,l-6-acetoxy-5-bromo-5-fluorohydrouracil melting at 167° to 168° C. The compound, recrystallized once again from acetic anhydride and chloroform, melted at 167.5° to 168.5° C.

*Anal.*—Calcd. for $C_6H_6O_4N_2FBr$: F, 7.06; N, 10.41; Br, 29.70. Found: F, 7.33; N, 10.21; Br, 30.06.

EXAMPLE 10

*Preparation of d,l-5-bromo-6-fluoro-5-methoxyhydrouracil*

This example is included herein to demonstrate an alternate method for preparing d,l-5-bromo-5-fluoro-6-methoxyhydrouracil. Another synthesis of this compound has been described previously in Example 1.

In this example, a solution was prepared by dissolving 0.27 gram of d,l-6-acetoxy-5-bromo-5-fluorohydrouracil, produced as described in Example 9, in 50 ml. of methanol. To this solution there was added 0.1 ml. of concentrated hydrobromic acid. This mixture was heated to its reflux temperature and it was maintained at that temperature for a period of about 2 hours. Thereafter, the reaction mixture was stirred with 1.0 gram of silver carbonate until it was neutral in reaction. The mixture was then filtered and the filtrate was evaporated to dryness. The residue which was obtained in this step was recrystallized from water and there was obtained 0.1 gram (41% of theory) of d,l-5-bromo-5-fluorohydrouracil. This compound melted at a temperature within a range from about 208.5° to 209° C.

EXAMPLE 11

*Preparation of d,l-5-fluoro-6-methoxyhydrouracil*

This example is included herein to demonstrate an alternate method of synthesizing d,l-5-fluoro-6-methoxyhydrouracil. Another method of preparing this compound is described in Example 2.

In this example, a solution was prepared by dissolving 241 mg. of d,l-5-bromo-5-fluoro-6-methoxyhydrouracil, produced as described in Example 10, in 15 ml. of methanol. There was added to this solution, 90 mg. of sodium acetate and the mixture was hydrogenated in the presence of 40 mg. of 10% palladium charcoal catalyst. It was observed that, in a period of about 3 minutes, 21 ml. of hydrogen had been taken up by the reaction mixture, following which uptake of hydrogen ceased. The catalyst was removed from the reaction mixture by filtration and, thereafter, the reaction mixture was evaporated to a syrup. This syrup was then dissolved in 10 ml. of water and the solution, thus obtained, was stirred with a small amount of Dowex 50–8X cation exchange resin in order to remove sodium ions present therein. The filtrate from the resin was lyophilized to yield 140 mg. of crude d,l-5-fluoro-6-methoxyhydrouracil containing some 5-fluorouracil.

EXAMPLE 12

*Preparation of d,l-5-bromo-5-fluoro-6-hydroxyhydrouracil*

In this example, 5.0 grams of 5-fluorouracil was suspended in 100 ml. of water. This suspension was cooled using an ice bath and 2 ml. of bromine were slowly added to the cooled suspension. The ice bath was removed and the solution was stirred at room temperature for a period of about 15 minutes until it was colorless.

To this solution there was added, with stirring, Dowex 1–X4 (acetate) until only a slight precipitation was observed when silver nitrate was added thereto. The solution was, thereafter, filtered from the resin and the filtrate was evaporated in vacuo to a white solid. This solid was taken up with ether, filtered and dried for a short time in vacuo at a temperature of about 60° C. There was obtained d,l-5-bromo-5-fluoro-6-hydroxyhydrouracil, melting at 147° to 148° C., in a yield of 5.56 grams (63% of theory). Recrystallization of this compound was effected by dissolving same in 15 ml. of ethyl acetate and adding 7 ml. of petroleum ether to yield 2.72 grams of d,l-5-bromo-5-fluoro-6-hydroxyhydrouracil melting at a temperature of 181° to 182° C.

EXAMPLE 13

*Preparation of d,l-5-fluoro-6-hydroxyhydrouracil*

In this example, a solution was first prepared by dissolving 4.58 ml. (2 millimole) of d,l-5-bromo-5-fluoro-6-hydroxyhydrouracil in 22 ml. of water containing 180 mg. of sodium acetate. The d,l-5-bromo-5-fluoro-6-hydroxyuracil employed in this example was prepared in the manner described in Example 12. While dissolved in the aqueous sodium acetate solution, the d,l-5-bromo-5-fluoro-6-hydroxyuracil was hydrogenated using 80 mg. of 10% palladium charcoal catalyst. Over a period of about 30 minutes, 45.5 ml. of hydrogen was taken up, following which the reaction ceased. When the reaction was completed, the solution was filtered to remove the catalyst therefrom. The solution was adjusted to pH 8.0 by addition of sodium hydroxide, following which it was poured on a column (1.4 x 29 cm.) Dowex 1–4X (acetate) 100–200 mesh. Elution with water at a flow rate of 180 ml. per hour gave, after an initial 92 ml. forerun, a fraction of 99 ml. volume with total absorption $E_{280}^{0.1\ N\ HCl}$ of 370 and $E_{260}^{1\ N\ NaOH}$ of 16,700. Elution with 0.1 N acetic acid (58 ml.) yielded a solution having $E_{280}^{0.1\ N\ HCl}$ 1440 and $E_{260}^{1\ N\ NaOH}$ 730

Fraction 2 was lyophilized to yield 150 mg. (50%) of d,l-5-fluoro-6-hydroxyhydrouracil in the form of a white powder melting at 140° C. with gas evolution. This product, upon further heating, resolidified and melted again at a temperature of 270–280° C., with decomposition. Recrystallization of the powdery product from 2 ml. of boiling ethanol yielded d,l-5-fluoro-6-hydroxyhydrouracil melting at a temperature of 184° C.

*Anal.*—Calcd. for $C_4H_5FN_2O_3$: C, 32.44; H, 3.40; F, 12.83. Found: C, 32.57; H, 3.29; F, 12.50.

EXAMPLE 14

*Preparation of l-5-bromo-5-fluoro-6-hydroxyhydrouracil*

In this example, a mixture of 1.08 grams (3.0 millimoles) of crude l - 5 - bromo - 5 - fluoro - 6 - methoxy-5,6-dihydro-2'-deoxyuridine and 10 ml. of red fuming nitric acid was heated on a steam bath for a period of about 20 minutes. At the end of that period of time, the reaction mixture was cooled and 50 ml. of water was added thereto. The solution was evaporated in vacuo, the residue was taken up in ether and subsequently, the ether was removed by evaporation. The residue which was thus obtained was slurried with boiling ether, following which it was cooled in a Dry Ice bath. A crystalline product as obtained which was filtered and washed with ether. There as obtained 422.4 mg. of l-5-bromo-5-fluoro-6-hydroxyhydrouracil melting at a temperature of 158–163° C., $[\alpha]^{28}_D$ —10 (c.8 in ethyl acetate).

This compound was subsequently dissolved in 5 ml. of ethyl acetate and reprecipitated with 5 ml. of petroleum ether. There was obtained, upon reprecipitation, 94.5 mg. of l-5-bromo-5-fluoro-6-hydroxyhydrouracil melting at a temperature of 175–178° C.; $[\alpha]^{27}_D$ —34.2° (C. 1 in ethyl acetate).

For completeness of disclosure, the method of preparation of l-5-bromo-5-fluoro-5,6-dihydro-6-methoxy-2'-deoxyuridine, which was used as the starting material in this example, is given hereinafter. It should be fully understood, however, that neither the compound itself, nor the method disclosed herein for its preparation, is a part of the present invention.

In producing l-5-bromo-5-fluoro-5,6-dihydro-6-methoxy-2'-deoxyuridine, 41.6 grams (0.52 mole) of bromine were dissolved in 960 ml. of methanol. This solution was cooled to a temperature of about —5° C., following which there was added thereto with vigorous stirring, 143.2 grams (0.52 mole) of silver carbonate. This mixture was stirred at a temperature of about —5° C. for a period of about 30 minutes. During this time, the solution which originally on its preparation manifested a distinct red coloration became light yellow in color.

The methyl hypobromite solution which was prepared as described in the preceeding paragraph was filtered directly into an ice-cold mixture of 50 grams (0.203 mole) of 2'-deoxy-5-fluorouridine and 750 ml. of methanol. This mixture was stirred with continuous cooling to a temperature of about 2° C. for a period of about 60 minutes. Thereafter, an additional 45 grams of silver carbonate was added to the mixture and stirring was continued for a period of about 60 minutes. The solution which was pale yellow in color was filtered and subsequently concentrated in vacuo to a volume of about 400 ml. This solution was clarified by filtration through celite and the filtrate was evaporated to a colorless syrup which was taken up in 100 ml. of ether. The ether solution, thus obtained, was refrigerated to produce a crystalline product. The crystals were separated from the solution by filtration, washed with cooled ether and dried in vacuo at a temperature of 60° C.

There was obtained 30.46 grams of d-5-bromo-5-fluoro-6-methoxy-5,6-dihydro-2'-deoxyuridine melting at 151° to 152° C.; $[\alpha]_D$ +52.6° (methanol). Addition of 110 ml. of the combined mother liquors and subsequent washing thereof yielded 24.49 grams of the compound melting at 112° to 115° C.; $[\alpha]_D$ +22.2.

The first crop of crystals, that is, 30.46 grams of product melting at 151° to 152° C. $[\alpha]_D$ +52.6° (methanol), was recrystallized from 55 ml. of butyl acetate. There was obtained 24.66 grams of pure d-5-bromo-5-fluoro-6-methoxy-5,6-dihydro-2'-deoxyuridine melting at 166.5° to 167.5° C. The second crop of crystals, that is, 24.49 grams of the compound melting at 112° to 115° C. $[\alpha]_D$ 22.2°, was recrystallized from ethyl acetate with subsequent addition of 5 ml. of petroleum ether. The crystalline product, thus obtained, melting at 157° to 158° C.

was recrystallized from 10 ml. of butyl acetate yielding 6.2 grams of the pure dextro isomer melting at 166.5° to 167.5° C.

The levo isomer of this compound was isolated by evaporating the final mother liquor, dissolving the residue, thus obtained, in water and lyophilizing the solution. The product, namely, l-5-bromo-5-fluoro-6-methoxy-5,6-dihydro-2'-deoxyuridine, was obtained in the form of a powder in a yield of 15.0 grams $[\alpha]^{27}_D$ —9.9° (C., 1.0% in water).

Anal.—calcd. for $C_{10}H_{14}BrFN_2O_6$: Br, 22.38; F, 5.32; N, 5.84. Found: Br, 21.89; F, 4.98; N, 7.49.

EXAMPLE 15

*Preparation of d,l-5-bromo-5-fluoro-6hydroxyhydrocytosine*

In this example, 2.58 grams (20 millimoles) of 5-fluorocytosine were suspended in 100 ml. of ice cold water. To this suspension, there was added 1.1 ml. (21.8 millimoles) of bromine in a dropwise fashion. During the addition of bromine, the reaction mixture was continuously stirred. There was obtained a clear yellow solution containing $$E^{0.1\ N\ HCl}_{280}\ 2340$$

This solution was chromatographed on a Dowex 1–X4 (acetate column) 2.2 x 18 cm. at a flow rate of 1,000 ml. per hour. Water was used as the eluent. After a forerun of 100 ml., three fractions were collected, each measuring 200 ml. These fractions had total absorptions $$E^{0.1\ N\ HCl}_{280}$$

of 1080, 735, and 500 respectively. Fraction 2, upon evaporation in vacuo to a small volume, yielded 1.124 grams (25% of theory) of crystalline d,l-5-bromo-5-fluoro-6-hydroxyhydrocytosine melting at a temperature of 158° C. with decomposition.

Anal.—Calcd. for $C_4H_5BrFN_3O_2$: Br, 35.36; F, 8.41; N, 18.59. Found: Br, 35.16; F, 8.30; N, 18.28.

EXAMPLE 16

*Preparation of d-5-bromo-5-fluoro-6-hydroxyhydrouracil*

A mixture of 1.0 gram (2.8 millimole) of d-5-bromo-5-fluoro-6-methoxy-5,6-dihydro-2'-deoxyuridine, prepared as described in Example 14, and 6 ml. of red fuming nitric acid was heated on a steam bath for 20 minutes. After cooling, 50 ml. of water was added. The solution was evaporated in vacuo, the residue was slurried with ether and the mixture was chilled in a Dry Ice bath. There was obtained 318 mg. of d-5-bromo-5-fluoro-6-hydroxyhydrouracil, melting at 175°–177° C., with decomposition.

Recrystallization from about 5 ml. of ethyl acetate, with chilling on Dry Ice, gave 80 mg. of d-5-bromo-5-fluoro-6-hydroxyhydrouracil, melting at 180°–181° C., with decomposition, $[\alpha]_D^{28}$ +40.7° (c. 1.0 in ethyl acetate).

Anal.—Calcd. for $C_4H_4BrFN_2O_3$: C, 21.16; H, 1.78; Br, 35.20; F, 8.37. Found: C, 21.57; H, 1.99; Br, 35.05; F, 8.44.

Upon addition of petroleum ether to the ethyl acetate mother liquor, there was obtained a second crop of 165 mg., melting at 177°–178° C., with decomposition $[\alpha]_D^{28}$ +32.7 (c. 1.2 in ethyl acetate).

We claim:
1. 5-bromo-5-fluoro-6-hydroxyhydrocytosine.
2. 5-bromo-5-fluoro-6-hydroxyhydrouracil.
3. 5-fluoro-6-hydroxyhydrouracil.
4. 5-fluoro-6-methoxyhydrouracil.
5. 6-ethoxy-5-fluorohydrouracil.
6. 6-butoxy-5-fluorohydrouracil.
7. A compound of the formula

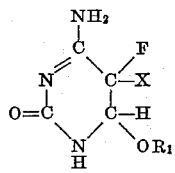

in which $R_1$ is a member selected from the group consisting of hydrogen, lower alkyl and lower aliphatic acyl and in which the symbol X is a member selected from the group consisting of hydrogen, bromine and chlorine.

8. A compound of the formula

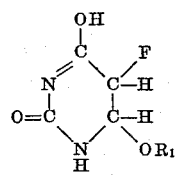

wherein $R_1$ is lower alkyl.

References Cited by the Examiner

UNITED STATES PATENTS 2,993,039   7/1961   Schroeder _____ 260—211.5

OTHER REFERENCES

Arey et al., ed. Dorland's Illustrated Medical Dictionary, 23rd edition, W. B. Saunders Co., Phila., 1961, pages 229–230, 745 and 1209–1210.

Burger, ed. Medicinal Chemistry, 2nd edition, Interscience Publishers, Inc., New York, 1960, pages 1077–1087.

Johnson et al., Jour. Amer. Chem. Soc., vol. 59, 1937, pages 2436–2439.

Johnson, Jour. Amer. Chem. Soc., vol. 65, 1943, pages 1218–1219.

Wang, Nature, vol. 180, July 1957, pages 91–92.

ALEX MAZEL, *Primary Examiner.*

LEWIS GOTTS, NICHOLAS S. RIZZO, HENRY R. JILES, *Examiners.*

J. R. GENTRY, MARY U. O'BRIEN,
*Assistant Examiners.*